(No Model.)
W. F. HENRY, W. P. BOLLES & A. McKEE.
WHIFFLETREE ATTACHMENT.
No. 497,496. Patented May 16, 1893.
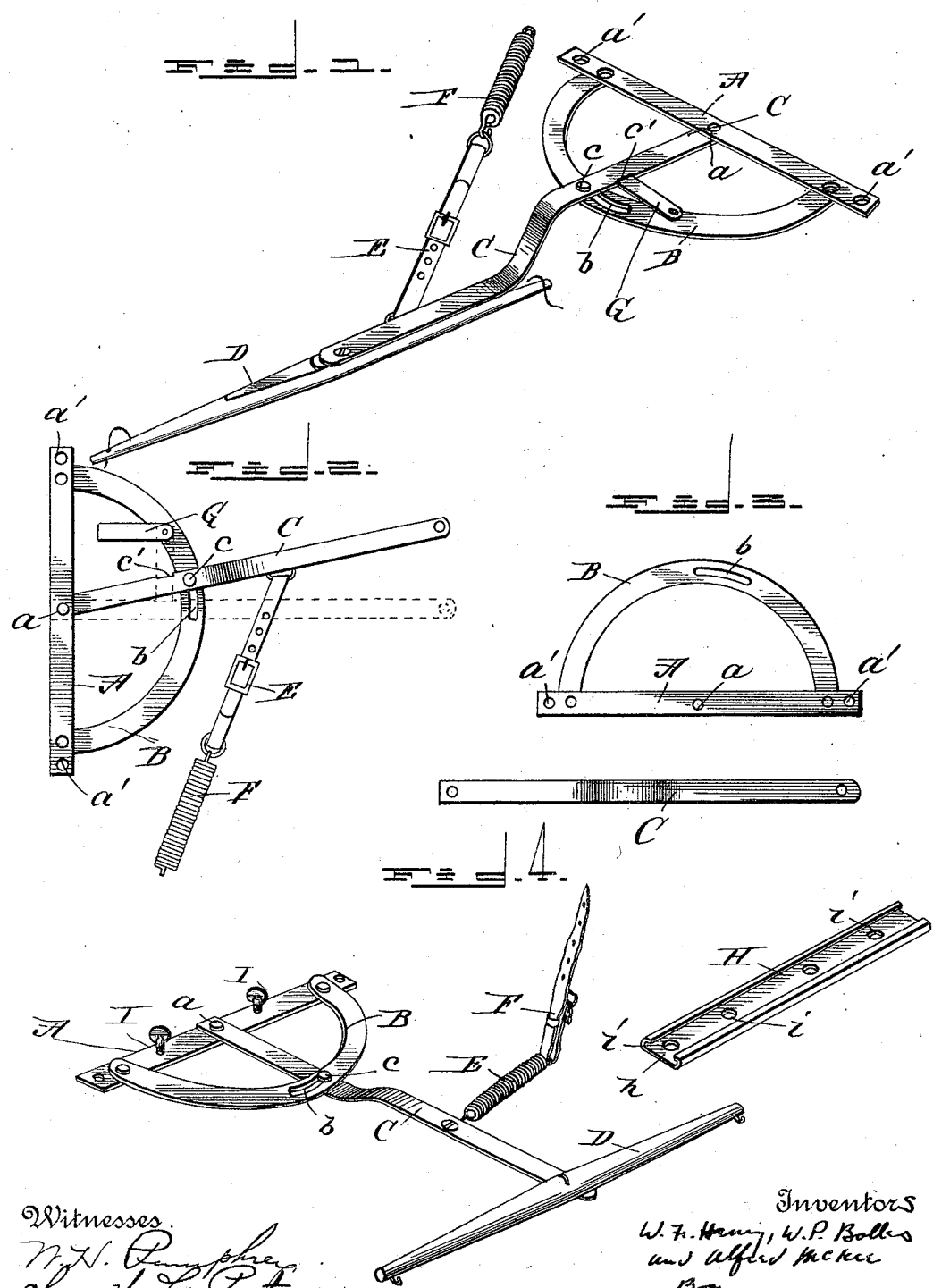

UNITED STATES PATENT OFFICE.

WILLIAM FITZ HENRY, WILLIAM P. BOLLES, AND ALFRED McKEE, OF BLOOMINGTON, ILLINOIS.

WHIFFLETREE ATTACHMENT.

SPECIFICATION forming part of Letters Patent No. 497,496, dated May 16, 1893.

Application filed September 12, 1892. Serial No. 445,673. (No model.)

*To all whom it may concern:*

Be it known that we, WILLIAM FITZ HENRY, WILLIAM P. BOLLES, and ALFRED MCKEE, of Bloomington, in the county of McLean and State of Illinois, have invented certain new and useful Improvements in Whiffletree Attachments; and we do hereby declare the following to be a full, clear, and exact description of the invention, such as will enable others skilled in the art to which it appertains to make and use the same.

Our invention relates to a new and improved whiffletree attachment and is designed to secure a whiffletree to the shafts of a vehicle in such manner that a colt or unbroken animal may be conveniently harnessed beside a trained animal. In the Letters Patent granted to us on the 6th day of October, 1891, No. 460,823, we show and describe a similar device wherein the whiffletree is rigidly secured to one of the shafts. In the present invention the whiffletree is flexibly secured to one of the shafts and is provided with means for rendering the attachment rigid at will, and it consists in the novel construction and arrangement of parts hereinafter fully described and afterward definitely pointed out in the claims, due reference being had to the accompanying drawings, wherein—

Figure 1 is a perspective view of our improved device; Fig. 2 a top plan view; Fig. 3 a detail view showing the parts detached, and Fig. 4 a perspective view of a modification.

Referring to the drawings the letter A indicates a bar to the under side of which is bolted or riveted an arc-arm the rear end of which is pivotally secured to the bar A by means of a bolt $a$ and to the outer end of said arm is pivotally fastened the whiffletree D. The guide bar B is provided with a slot $b$ and the arm C is provided with a pin or bolt $c$ which passes through said slot and plays therein and serves to confine the arm to the guide bar. To the arm C, at a suitable point, is secured a strap E which at its other end is secured to one end of a coiled spring F which in turn is secured to the shaft. To the guide bar B is pivoted a dog G which is adapted to be turned so that its free end will abut against the arm C and lock said arm rigid with the guide bar. The arm C is preferably recessed, as at $c'$ in which recess rests the end of the dog G when in a locked position, and prevents the accidental displacement of said dog.

When it is desired to use the device the bar A is secured to the under side of one of the shafts by means of screws, screw holes $a'$ $a'$ being pierced through the arm for the purpose. When the bar is not desired to be used it can be removed from the device by unscrewing the screws.

From the above it will be seen that a colt or untrained animal may be conveniently harnessed to the whiffletree D beside a trained animal harnessed between the shafts, and the flexible connection between the whiffletree and shafts affords an even draft. When it is desired to make the whiffletree attachment rigid the dog G is turned to the position shown in Fig. 1, so as to engage the arm C and lock it rigid with the guide bar B.

In Fig. 4, we have shown another means for attaching the bar A to the shafts. As thus constructed a plate H is screwed or bolted to the under side of one of the shafts, said plate being provided with a T shaped groove $h$. The bar A secured to the guide bar B is adapted to be slid within the grooved plate H and is fastened therein by means of thumb-screws I. I. fitted in said bar and adapted to engage perforations $i.$ $i.$ in the plate H. In all other respects the construction is identical with that before described. When thus constructed the whiffletree can be very quickly attached and detached.

What we claim is—

1. In a whiffletree attachment, the combination of the bracket adapted to be secured to the shaft of a vehicle, the arc shaped guide bar B slotted as shown and secured to said bracket, the arm C pivotally secured to said bracket and provided with a bolt playing in said slot, a dog G pivoted to the guide bar and adapted to engage the arm, and a contractile spring F secured at one end to the arm and at its other end adapted to be secured to the shaft substantially as described.

2. In a whiffletree attachment, the combination of the grooved plate H adapted to be secured to the shaft of a vehicle, the bar A fitting in said grooved plate and provided with thumb screws I. I., the guide bar B slotted as shown and secured to said bar A, the arm C pivotally secured to said bracket and provided with a bolt playing in said slot, a dog G pivoted to the guide bar and adapted to engage the arm, and a contractile spring F secured at one end to the arm and adapted to be secured at its other end to the shaft, substantially as shown and described.

In testimony whereof we have signed this specification in the presence of two subscribing witnesses.

WILLIAM FITZ HENRY.
WILLIAM P. BOLLES.
ALFRED McKEE.

Witnesses:
H. H. BOLLES,
SAIN WELTY.